US012055286B1

(12) United States Patent
Clark et al.

(10) Patent No.: US 12,055,286 B1

(45) Date of Patent: Aug. 6, 2024

(54) ROTATABLE LATCH FOR LIGHT FIXTURE HOUSINGS

(71) Applicant: ABL IP Holding LLC, Atlanta, GA (US)

(72) Inventors: Stephen H. Clark, Downers Grove, IL (US); John Whittenhall, Roselle, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 18/238,851

(22) Filed: Aug. 28, 2023

(51) Int. Cl.
*F21V 17/18* (2006.01)
*F21S 8/02* (2006.01)
*F21V 21/04* (2006.01)
*F21V 23/00* (2015.01)

(52) U.S. Cl.
CPC .............. *F21V 17/18* (2013.01); *F21V 21/04* (2013.01); *F21V 23/008* (2013.01); *F21S 8/026* (2013.01)

(58) Field of Classification Search
CPC ........ F21V 17/18; F21V 21/04; F21V 21/041; F21V 21/047; F21V 21/048; F21V 21/049; F21V 23/008; F21S 8/02; F21S 8/026
See application file for complete search history.

(56) References Cited

U.S. PATENT DOCUMENTS

| | | | | | |
|---|---|---|---|---|---|
| 6,491,415 | B2 * | 12/2002 | Orellana | F21V 3/02 | 362/186 |
| 10,502,404 | B1 * | 12/2019 | Bowen | H02G 3/20 | |
| 10,760,751 | B1 * | 9/2020 | Bowen | F21V 21/048 | |
| 2015/0009675 | A1 * | 1/2015 | Wilcox | F21V 23/026 | 362/362 |
| 2021/0131650 | A1 * | 5/2021 | Crawford | F21V 17/18 | |

* cited by examiner

*Primary Examiner* — Alan B Cariaso
(74) *Attorney, Agent, or Firm* — Kilpatrick Townsend & Stockton LLP

(57) ABSTRACT

A light fixture mount including a base, a housing, a sled, and a latch rotatably coupled to the housing. The base defines an opening extending through the base. The housing is positioned on the base and defines a compartment, wherein an access opening is provided in the housing for access to the compartment. The sled is configured to be positioned at least partially within the compartment and includes a sled base configured to support a component for a light engine and a faceplate configured to cover the access opening of the housing. The latch is configured to rotate between a locked configuration and an unlocked configuration, wherein the latch engages and secures the sled to the housing.

20 Claims, 12 Drawing Sheets

ROTATABLE LATCH FOR LIGHT FIXTURE HOUSINGS

FIELD OF INVENTION

The present technology relates to a rotating latch for use in light fixtures.

BACKGROUND OF INVENTION

Recessed light fixtures are used in many different lighting applications. Because the fixtures are recessed, space is required above the ceiling surface for parts of the fixture. Sometimes the space above the ceiling is limited. This creates a need for a recessed fixture that occupies a minimal amount of plenum space. Conventionally drivers and their mounting plates use simple latching springs that must be vertically displaced to permit removal/replacement of these components. The needed vertical space for such displacement is often not available. Moreover, such springs require constant pressure to retain them open to permit removal of the drivers and their associated mounting plates. In small above-ceiling spaces with limited aperture cut outs, one handed operation is preferred. But if constant pressure is needed to retain a latching spring in an "unlatched" state, removing the driver at the same time with the same hand can prove difficult. Rather, use of two hands is typically required and the needed space for two hands is not always available.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described therein or to limit the meaning or scope of the patent claims below. Embodiments of the invention covered by this patent are defined by the below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the present disclosure provide a light fixture mount, including a base defining an opening extending through the base; a housing positioned on the base that defines a compartment, wherein an access opening is provided in the housing for access to the compartment; a sled configured to be positioned at least partially within the compartment, the sled including: a sled base configured to support at least one component for a light engine; and a faceplate extending from the sled base and at an angle relative to the sled base, wherein the faceplate is configured to at least partially cover the access opening when the sled is positioned at least partially within the compartment; and a latch configured to rotate between a locked configuration and an unlocked configuration, wherein, in the locked configuration, the latch engages and secures the sled to the housing.

BRIEF DESCRIPTION OF THE DRAWINGS

The disclosure will be readily understood by following detailed description in conjunction with the accompanying drawings, in which.

DETAILED DESCRIPTION

Figure 1:
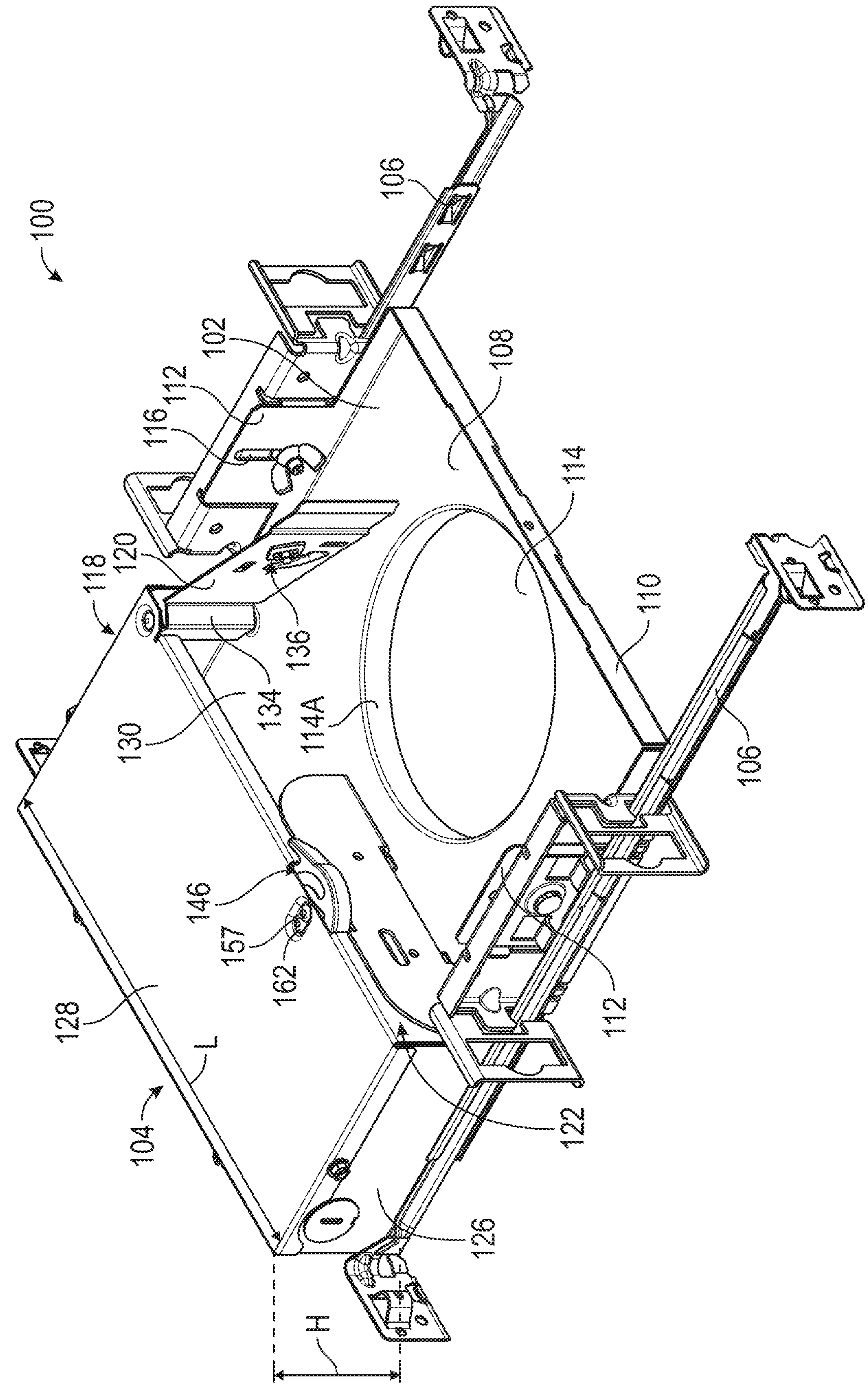
FIG. 1 is a top perspective view of an embodiment of a light fixture mount in accordance with the present disclosure.

The subject matter of embodiments of the present invention is described here with specificity to meet statutory requirements, but this description is not intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Each example is provided by way of illustration and/or explanation, and not as a limitation. For instance, features illustrated or described as part of one embodiment may be used on another embodiment to yield a further embodiment. Upon reading and comprehending the present disclosure, one of ordinary skill in the art will readily conceive many equivalents, extensions, and alternatives to the specific, disclosed luminaire types, all of which are within the scope of embodiments herein.

In the following description, positional terms like "above," "below," "vertical," "horizontal," "bottom," "top," and the like are sometimes used to aid in explaining and specifying features illustrated in the drawings as presented, that is, in the orientation in which labels of the drawings read normally. These meanings are adhered to, notwithstanding that the light fixtures or luminaires herein may be mounted to surfaces that are not horizontal.

FIG. 1 shows a perspective view of an embodiment of a light fixture mount 100. The light fixture mount 100 generally includes a base 102 and a housing 104. The mount 100 is configured to secure a light engine (not shown) withing a ceiling space such that the light engine may be at least partially concealed while emitting light generally downward into a room. In some embodiments, the base 102 may be configured to be positioned at or flush with the ceiling and may additionally support the housing 104 as well as any components of the light engine. The housing 104 may define a compartment 118 configured to contain wiring and various components for the light engine. For example, the light engine may include a light driver and at least one light source, such as a light emitting diode (LED) positioned on one or more printed circuit boards (PCB), or other light sources, such as but not limited to incandescent, halogen, or fluorescent light sources. Further, the light fixture mount 100 may be secured within the ceiling using at least one coupling rail 106; however, this is merely exemplary and is not required.

In further detail, the base 102 may be positioned beneath the housing 104 and may include a tray 108, a raised rim 110, and at least one coupling rail mounting flange 112 positioned at the rim. The tray 108 is depicted as a generally rectangular shape having an upper surface which may support the housing 104 and a light engine, and a lower surface positioned opposite the upper surface and configured to be positioned adjacent to or flush with a ceiling. Further, the tray 108 includes an opening 114 such that the light engine may emit light downwards through the tray 108 and into a room. Additionally, the at least on light source of the light engine may be positioned to fill the opening 114, concealing both the components of the light engine and the light fixture mount 100. Further, the opening 114 may include an opening rim 114A which may extend downwards from the lower surface of the tray 108. The opening rim 114A may be positioned within an opening within the ceiling as to hold the light fixture mount 100 and the light engine in place. In some embodiments, the base 102 may include a rim 110 around an outer perimeter of the tray 108 which may be configured to contain the components of the light fixture such that they do not extend out of the light fixture mount 100. The rim 110 may additionally provide for a series of apertures or other coupling points that may be used to secure the base 102, and subsequently the light fixture mount 100, in place.

The base 102 may be constructed of any material having sufficient structural integrity and rigidity. Suitable materials including but are not limited to polymeric or metallic (e.g., steel, aluminum, etc.) materials. Additionally, the base 102 is depicted as being rectangularly shaped, however, this is merely exemplary, and it is envisioned that the base 102 may take any shape including, but not limited to, circular, triangular, etc.

As mentioned previously, the housing 104 may be positioned on the upper surface of the tray 108 of the base 102 and may be configured to house components for a light engine, for example, the wiring, light driver, etc. The housing 104 may be formed by a series of side walls 126, a back wall 127, and a top wall 128 that, along with the base 102, collectively define a compartment 118. An access opening 130 may be formed on one side of the housing 104 and may be configured to provide access to the compartment 118 such that wiring and/or other components for the light fixture may be inserted, adjusted, or removed from within the compartment 118. The access opening 130 may be closed or sealed using a door 120 and/or a sled 122, both of which will be described in further detail below. In some embodiments, a fourth bottom wall may be used to define a bottom portion of the compartment instead of the base 102. The walls of the housing 104 may be formed separately and subsequently secured together to form the housing 104 using attachment methods known in the art such as, but not limited to, fasteners, welding, adhesives, or, in alternative embodiments, the housing 104 may be formed integrally. Moreover, while the housing 104 can be formed separately and subsequently attached to the base 102, in other embodiments it is formed integrally with the base 102. The housing 104 may be constructed from a variety of materials including, but not limited to, metals, composites, plastics, or other materials suited for use in light fixtures. Additionally, the dimensions and position of the housing 104 as depicted in the figures are merely exemplary and a variety of varying dimensions, shapes, and positions of the housing 104 are envisioned within the scope of this disclosure.

Additionally, in some embodiments, the housing 104 may be orientated as to minimize the vertical footprint of the light fixture mount 100. In other words, a length dimension (length L) and a width dimension (width W) of the housing 104 may be positioned to extend parallel to the base 102 with the short dimension (height H) extending perpendicular to the base 102. In such embodiments, the length dimension L and the width dimension W may be greater than the short dimension H. In typical light fixture mounts, components of the light fixture, including the light driver, are positioned within a housing or junction box that require a specific amount of vertical clearance that is not present in a variety of applications. The present light fixture mount 100 described herein provides the benefit of a smaller vertical footprint, so that the mount 100 may be used in applications where the amount of ceiling space is limited.

As noted above, the light fixture mount 100 may include at least one coupling rail 106 which may be configured to secure the light fixture mount 100 within the ceiling space. For example, each coupling rail 106 may be secured to joints, crossbeams or any other structure that may be found within a ceiling space using fasteners. To secure the coupling rails 106 to the light fixture mount 100, the base 102 may include mounting flanges 112 which extend generally upwards from the rim 110 of the base 102. The mounting flanges 112 include an aperture 116 which may be used to secure the coupling rails 106 to the base 102 using fasteners. The coupling rails 106 depicted in the figures are merely exemplary and a variety of other securement methods known in the art may be used to secure the light fixture mount 100 within the ceiling space.

Figure 2:
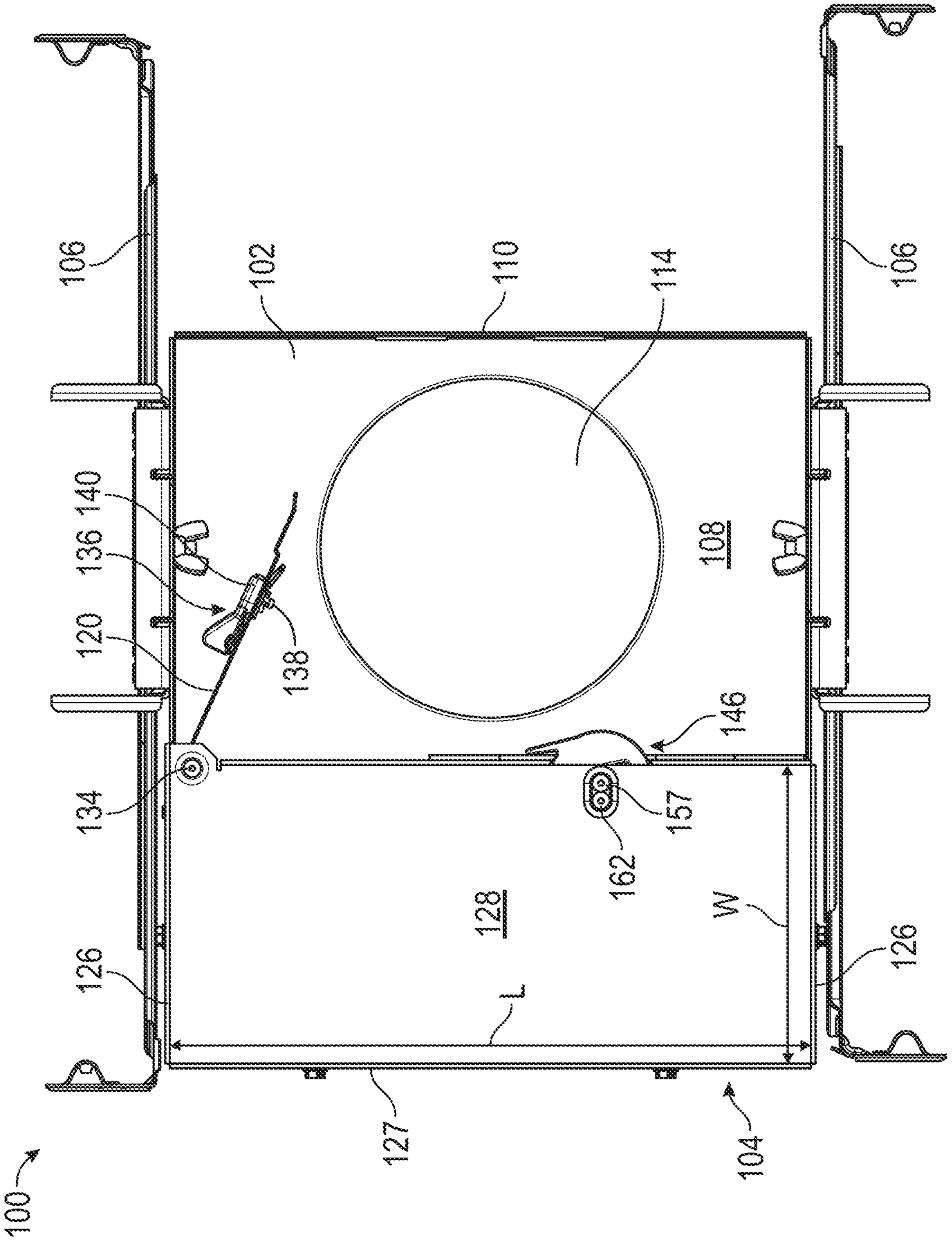
FIG. 2 is a top plan view of the light fixture mount of FIG. 1.

Still referring to FIG. 1 and FIG. 2, the door 120 may be positioned on one end of the access opening 130 and may be selectively movable between an unlocked configuration, providing access to the compartment 118, and a locked configuration, covering at least a portion of the access opening 130 of the housing 104. In some embodiments, the door 120 may be coupled to the upper surface of the tray 108 and/or the housing 104 using a hinge 134. The door 120 may be rotated about the hinge 134 to selectively rotate the door 120 between the unlocked configuration and the locked configuration. To lock the door 120 in a locked configuration, the door 120 may include a door latch 136 which may interact with a portion of the housing 104. In an exemplary embodiment, as depicted in the figures, the door latch 136 may be a rotatable mechanism including an internal latch 138 positioned on an internal surface of the door 120 and a handle 140 positioned on an external surface of the door. In operation, the door latch 136 may be rotated using the handle 140, engaging the internal latch 138 with a portion of the top wall 128 of the housing 104 or with the sled 122, securing the door 120 in a locked configuration. The door latch 136 is merely exemplary and it is envisioned that a variety of other locking mechanisms may be used including, but not limited to, form fitting, springs, bolts, alternative latch designs, etc. The door 120 may be formed of any material having sufficient structural integrity and rigidity.

Suitable materials include, but are not limited to, polymeric or metallic (e.g., steel, aluminum, etc.) materials. Additionally, in some embodiments, the door 120 may be manufactured or formed at the same time as the housing 104 and/or the base 102 to form a unitary body. The dimensions, design, and position of the door 120 as depicted in the figures is merely exemplary and a variety of dimensions, designs, and positions of the door 120 are envisioned within the scope of this disclosure.

Figure 3:
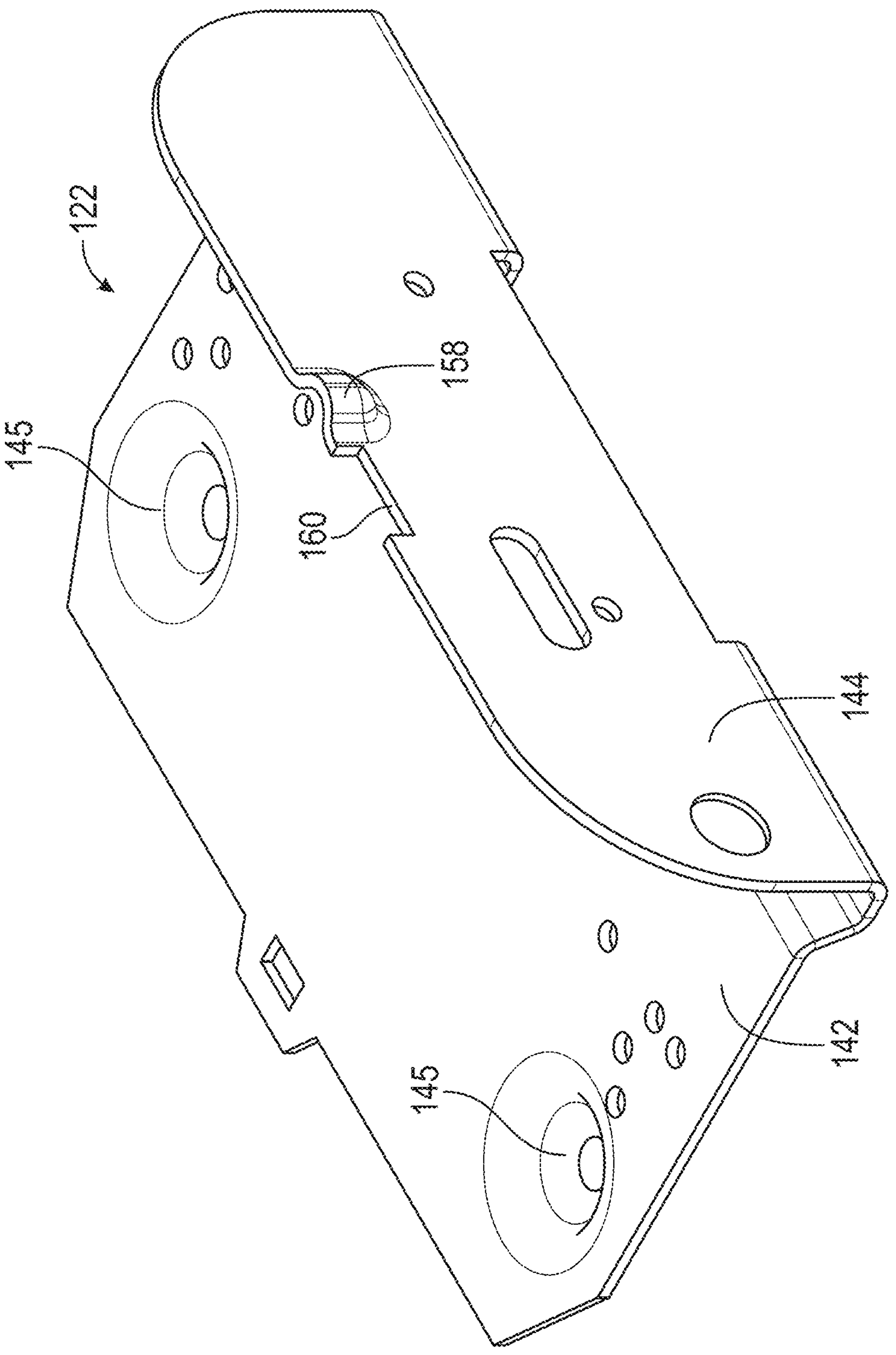
FIG. 3 is a top perspective view of the sled from FIG. 1 in isolation.

The sled 122 is depicted in isolation in FIG. 3 and may be configured to support various components of the light engine, such as the light driver. In further detail, the sled 122 is configured to be selectively retained on or removed from the housing 104, such that components positioned on the sled 122 may be easily accessed, installed, removed, or replaced. In some embodiments, the sled 122 may be generally L-shaped and include a sled base 142 and a faceplate 144 that extends from and at an angle relative to the sled base 142 (such as, but not limited to, between and including 450 to 900 relative to the plane of the sled base 142). In some embodiments, the faceplate 144 extends generally upwards from the sled base 142. The sled base 142 is positioned adjacent the base 102 and electronic components (e.g., drivers, etc.) may be mounted on it. When inserted into the compartment 118, the faceplate 144 of the sled 122 may be configured to block at least a portion of the access opening 130, concealing and containing components that may be positioned on the sled 122. In some embodiments, the sled 122 and the door 120 collectively form a front wall of the housing 104. In some embodiments, the internal latch 138 engages and disengages the sled 122 to lock and unlock the door 120. In some embodiments, the sled 122 may additionally include feet 145 positioned at the sled base 142 such that the sled 122 may be easily slid along the base 102 of the light fixture mount 100.

In typical light fixture mounts, components and wiring may be intermingled within a housing or junction box, leading to difficulties when only a single component, such as a light driver needs to be replaced or removed. For example, to access a light driver, the junction box or housing may need to be entirely or at least partially emptied, creating additional unnecessary work. Therefore, the addition of the sled 122 to the light fixture mount 100 described herein removes the necessity of removing wiring and/or other lighting components, resulting in a more efficient process compared to methods known in the art. For example, during installation, a light driver may first be installed on the sled 122 and inserted into the compartment 118 prior to wiring the light fixture, allowing for the light driver to remain in a consistent position while installation is completed. The sled 122 may be formed of any material having sufficient structural integrity and rigidity. Suitable materials include, but are not limited to, polymeric or metallic (e.g., steel, aluminum, etc.) materials. The dimensions, design, and position of the sled 122 as depicted in the figures is merely exemplary and a variety of dimensions, designs, and positions of the sled 122 are envisioned within the scope of this disclosure. Additionally, the sled 122 is described herein with regards to a light driver, however, this is merely exemplary, and it is envisioned within the scope of this disclosure that any components or combination of components associated with a light fixture may be used in conjunction with the sled 122.

Figure 4:
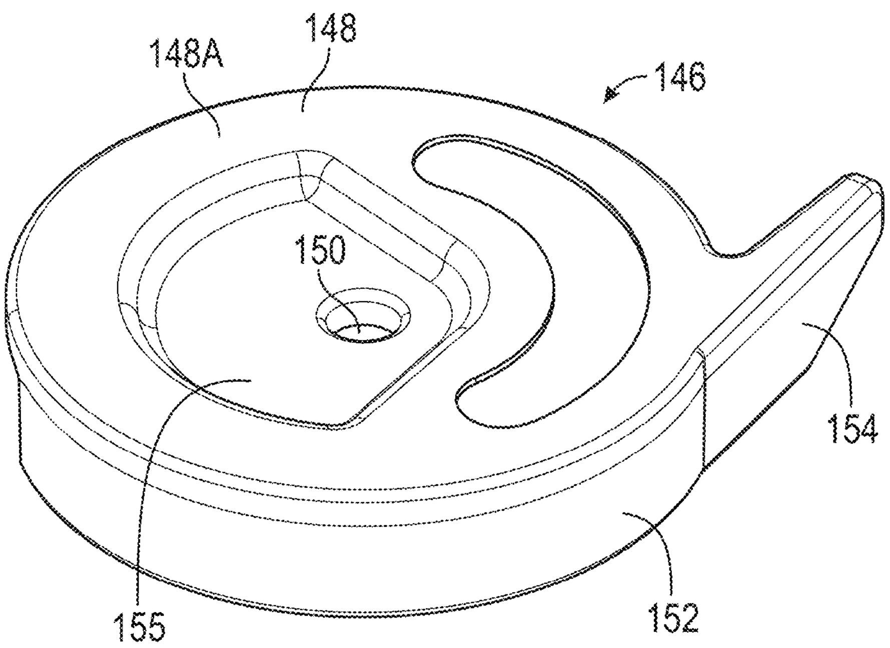
FIG. 4 is a top perspective view of the rotatable latch from FIG. 1.
Figure 5:
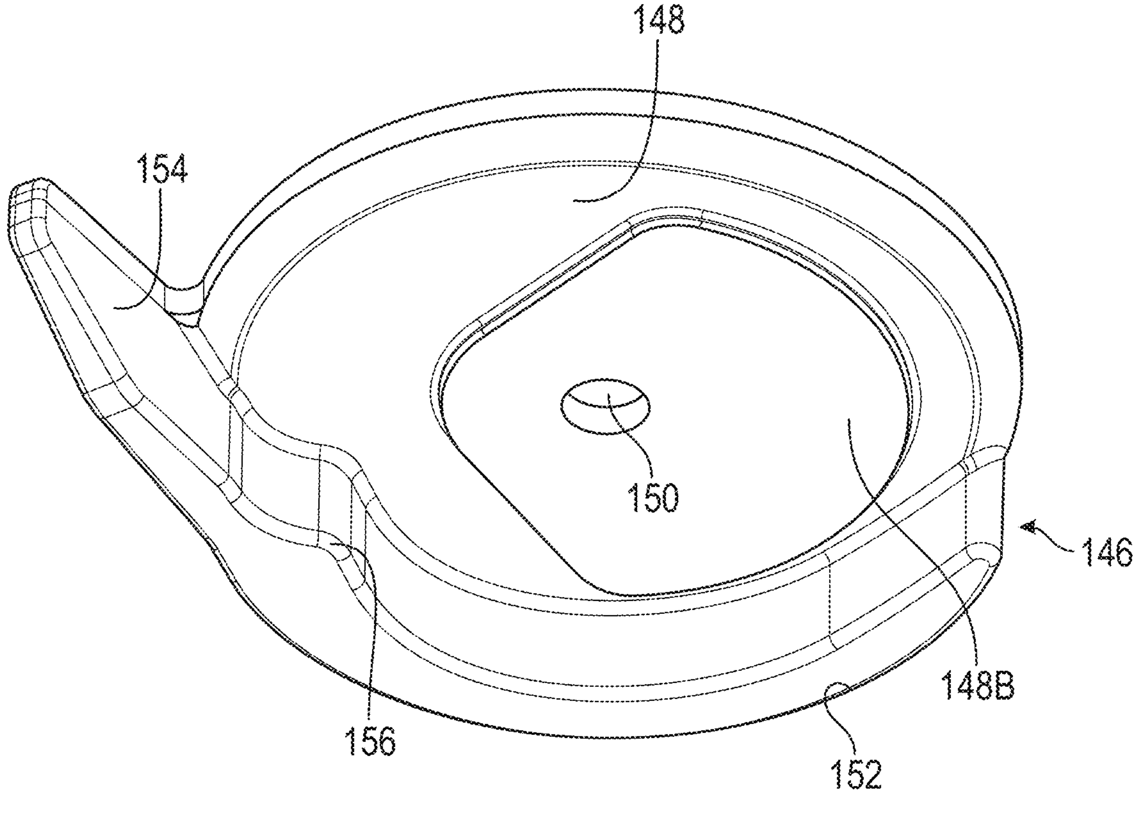
FIG. 5 is a bottom perspective view of the rotatable latch of FIG. 4.
Figure 6:
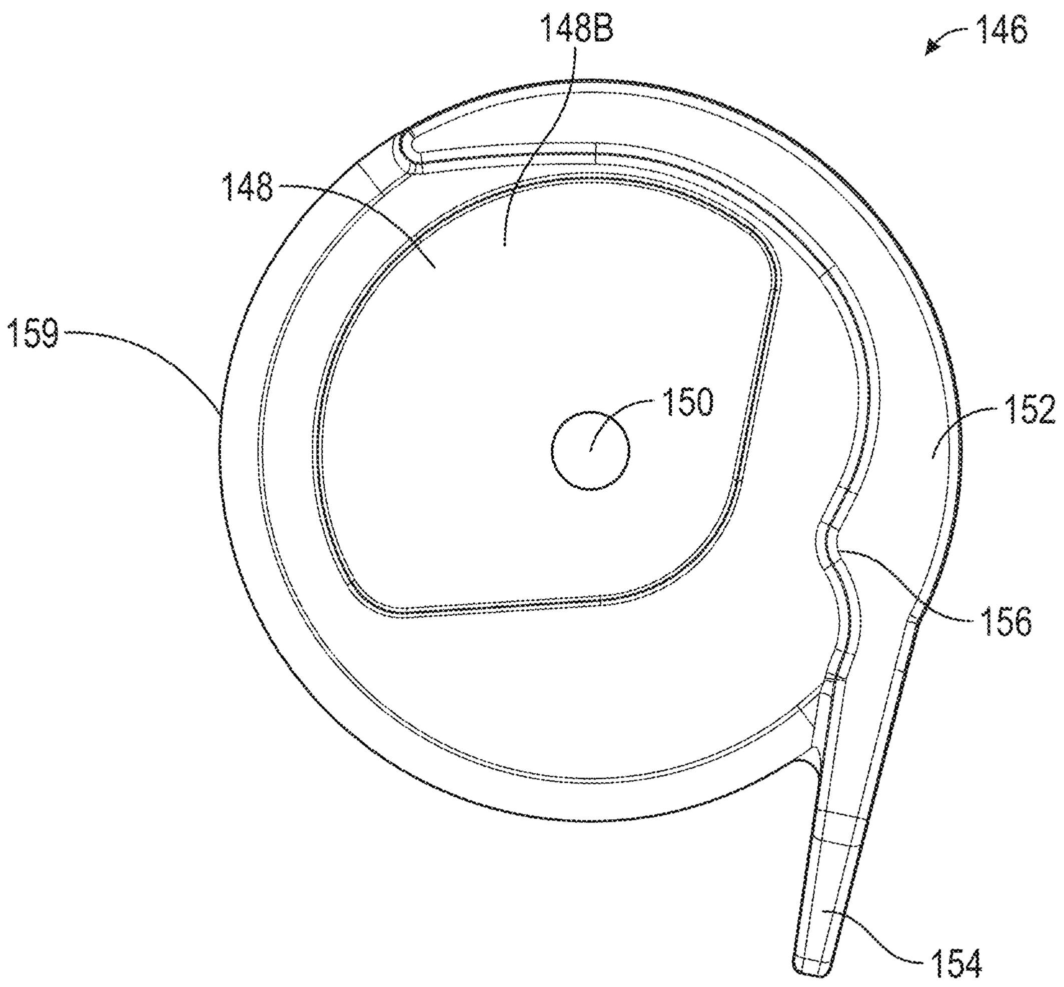
FIG. 6 is a bottom plan view of the rotatable latch of FIG. 4.

In some embodiments, a rotatable latch 146 may be used to secure or lock the sled 122 within the housing 104. The rotatable latch 146 is depicted in isolation in FIGS. 4-6. As shown, the rotatable latch 146 may include a body 148, an aperture 150, a lip 152, and a lever 154. Referring to FIG. 4, the body 148 may be generally circular and include a top surface 148A and a bottom surface 148B positioned opposite the top surface 148A. While the body 148 of the rotatable latch 146 is depicted in the figures as having a generally circular shape, this is merely exemplary and is not intended to be limiting. Rather, the body 148 could have other shapes such as, but not limited to, oval, triangular, square, etc. The aperture 150 may be positioned through the center of the body 148, extending from the top surface 148A to the bottom surface 148B. Referring back to FIG. 1 and FIG. 2, a fastener 157 may be positioned through the aperture 150, rotatably coupling the rotatable latch 146 to the top wall 128 of the housing 104. While the rotatable latch 146 is depicted in the figures as being coupled to the top wall 128 of the housing 104, this is merely exemplary and is not intended to be limiting. Rather, the rotatable latch 146 may be attached to the housing 104 at other locations.

Referring back to FIGS. 4-6, the lip 152 may be positioned to extend downwardly (such as, but not limited to, perpendicularly) from the bottom surface 148B of the body 148 and along the perimeter of the body 148. The lip 152 may extend around the perimeter of the body 148 to any degree, but typically will extend only along a portion of the perimeter and not entirely around the perimeter of the body 148. A ridge 156 may extend radially inwardly on the lip 152 so as to form a thickened portion of the lip 152. The lever 154 may be positioned adjacent to and/or extend from the lip 152 and may extend tangentially relative to an outer edge of the body 148, providing a user with both a gripping structure and a mechanical advantage to allow for easier rotation of the rotatable latch 146.

The components of the rotatable latch 146 may be formed simultaneously to form a unitary body or, alternatively, may be formed separately and assembled. The latch 146 may be formed of any material having sufficient structural integrity and rigidity. Suitable materials include, but are not limited to, polymeric or metallic (e.g., steel, aluminum, etc.) materials. The dimensions, design, and configuration of the latch 146 as depicted in the figures is merely exemplary and are not intended to be limiting. Various combination of components, dimensions, designs, and configurations of the latch 146 are envisioned within the scope of this disclosure.

To lock and unlock the sled 122 from the housing 104, the rotatable latch 146 may be selectively rotated between a locked configuration and an unlocked configuration. In some embodiments, the body 148 of the rotatable latch 146 extends generally within a plane and the rotatable latch 146 rotates within and/or parallel with that plane. In this way, the rotatable latch 146 is contained with the plane when transitioned between the locked and unlocked configurations, thereby reducing the clearance required for installation of the light fixture mount 100.

In some embodiments, the rotatable latch 146 rotates within a footprint of the body 148, whereby the footprint of the body 148 is defined by an outer, or peripheral, edge 159 of the body 148. In such embodiments, as the rotatable latch 146 is rotated between the locked and unlocked configurations, the body 148 of the latch 146 is contained within the footprint. Therefore, the latch 146 may be transitioned between the locked and unlocked configurations without the body 148 being moved outside the footprint, reducing the overall clearance required for installation of the light fixture mount 100.

Figure 7:
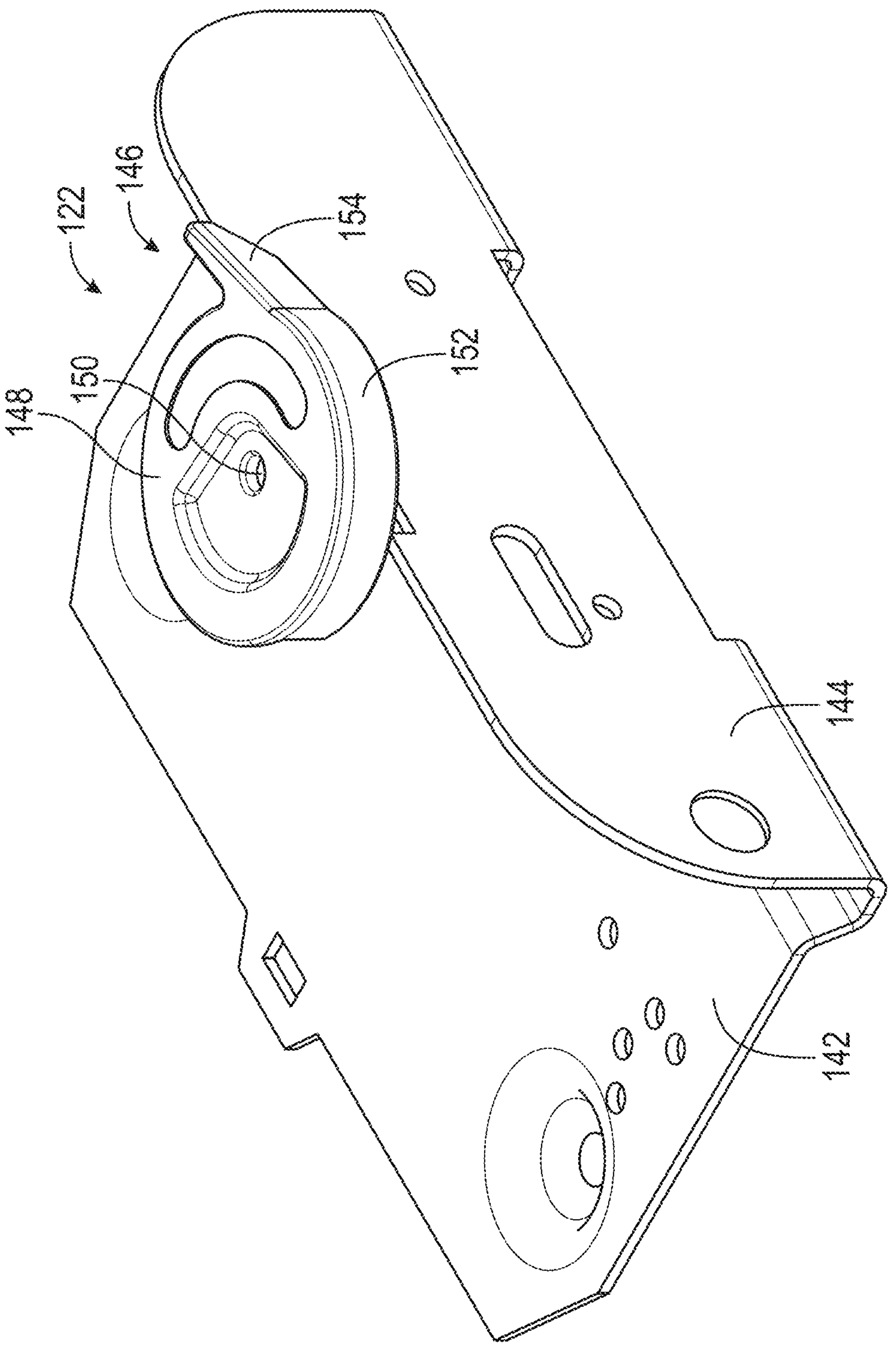
FIG. 7 is a top perspective view of the rotatable latch and the sled in a locked configuration in accordance with the present disclosure.
Figure 8:
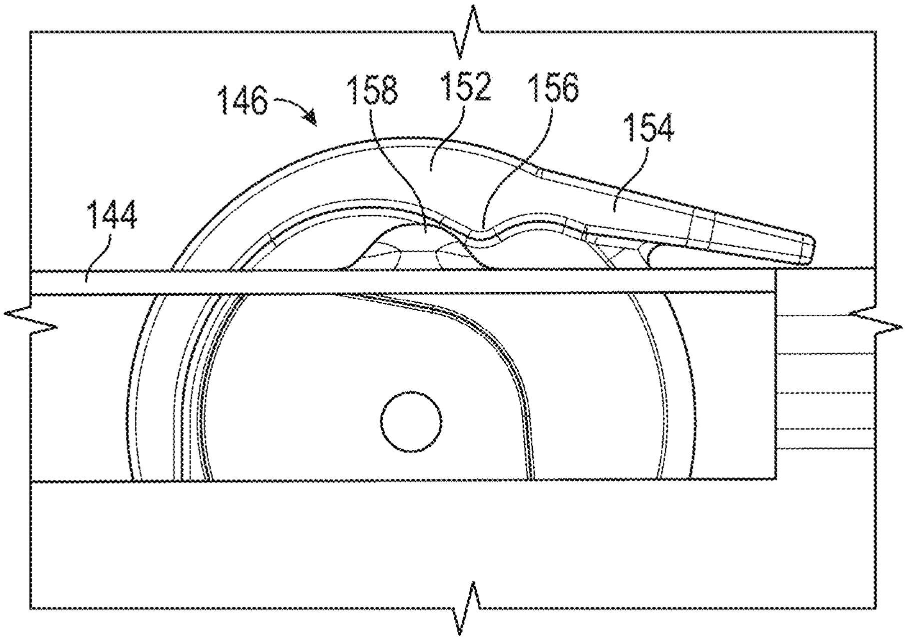
FIG. 8 is an enlarged partial bottom plan view of the latch and the sled of FIG. 7.
Figure 9:
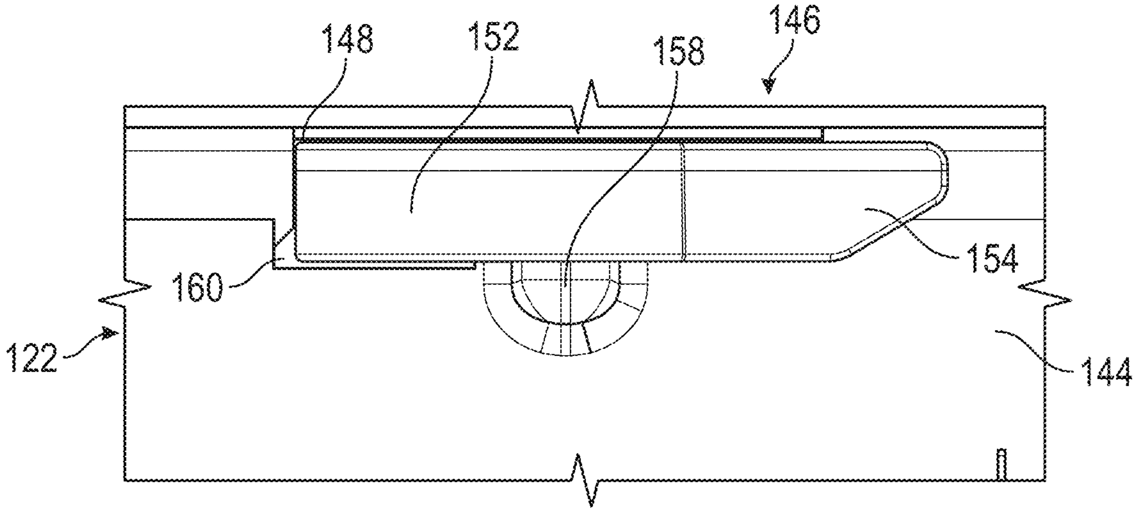
FIG. 9 is an enlarged partial front elevation view of the latch and the sled of FIG. 7.

FIGS. 7-9 depict the relative positions of the rotatable latch 146 (which is attached to the housing 104) and the sled 122 when in a locked configuration. As shown in FIG. 9, the lip 152 extends partially over the faceplate 144 of the sled 122 (below a top edge 147 of the faceplate 144) to create an abutment between the lip 152 and the sled 122 that helps to prevent the sled 122 from backing out of the housing 104. A cut-out 160 along the top edge 147 of the faceplate 144 is provided to accommodate the lip 152. To additionally secure the sled 122 within the housing 104, referring now to FIG. 8, when in the locked configuration the ridge 156 of the rotatable latch 146 abuts a projection 158 on the sled 122 to retain the latch 146 in the locked configuration, preventing inadvertent rotation or unlocking of the latch 146. In other words, to rotate the latch 146 to transition from the locked configuration to the unlocked configuration a force must be applied to the lever 154 of the latch 146 such that the ridge 156 is forced over the projection 158. In some embodiments, to provide additional securement, the ridge 156 and the projection 158 may be configured to be over-molded or over-fitted in such a manner that an additional force must be applied to the rotatable latch 146, additionally securing latch 146 in the locked configuration. In such embodiments, the interaction of the ridge 156 passing over the projection 158 may provide a user with a tactile feel, providing feedback as to whether the latch 146 is in either the unlocked configuration or the locked configuration.

Figure 10:
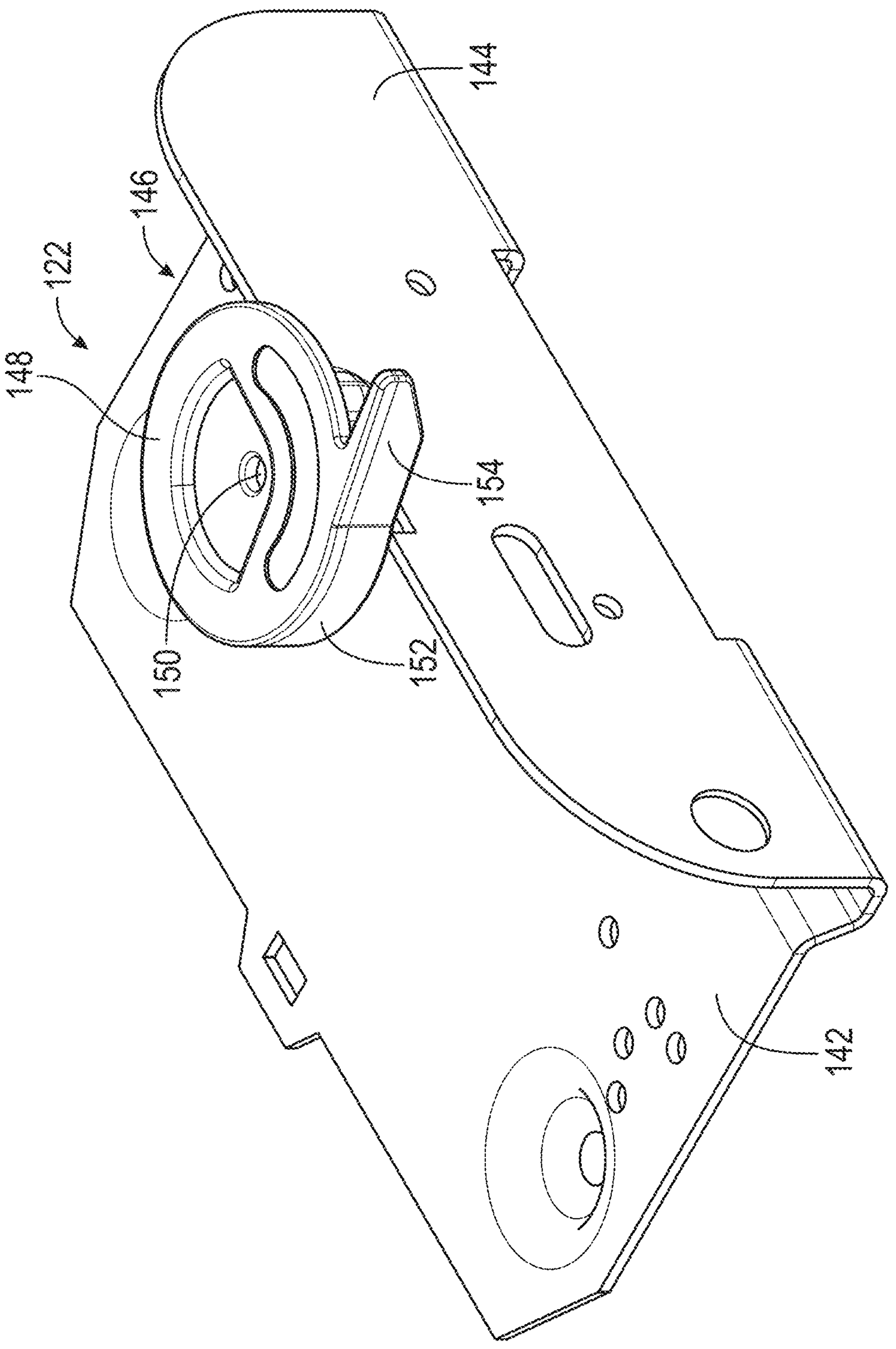
FIG. 10 is a top perspective view of the rotatable latch and the sled in an unlocked configuration in accordance with the present disclosure.
Figure 11:
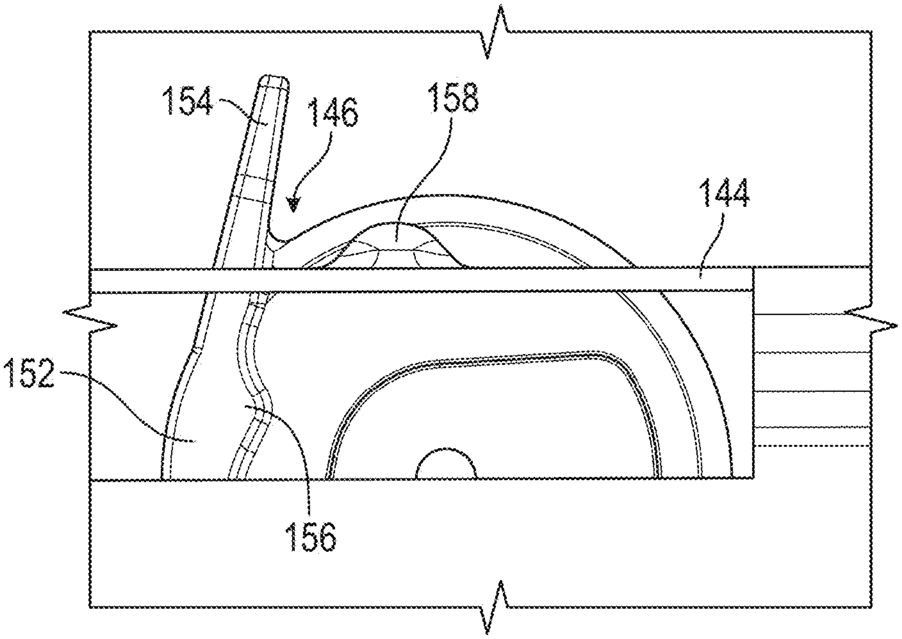
FIG. 11 is an enlarged partial bottom plan view of the latch and the sled of FIG. 9.
Figure 12:
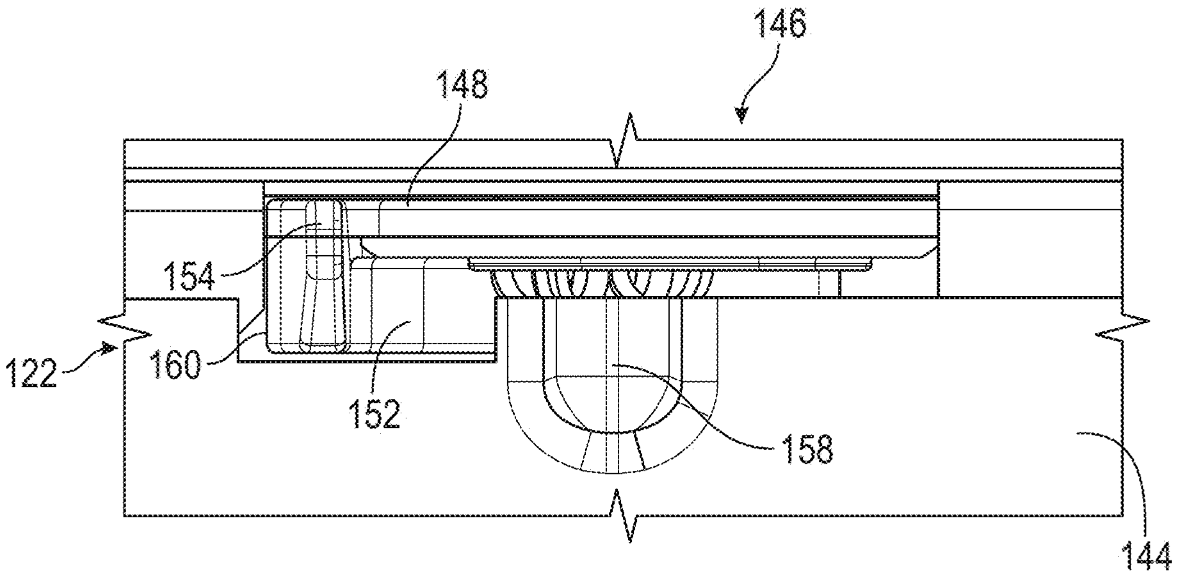
FIG. 12 is an enlarged partial front elevation view of the latch and the sled of FIG. 9.

FIGS. 10-12 depict the rotatable latch 146 in an unlocked configuration. As shown, the rotatable latch 146 is positioned such that the lip 152 and/or the lever 154 do not overlap with the faceplate 144 of the sled 122 and, therefore, the sled 122 may move freely relative to the housing 104. The cut-out 160 on the faceplate 144 of the sled 122 provides clearance for the lip 152 and/or lever 154 to rotate into the housing 104 and out of the way when the rotatable latch 146 is moved into the unlocked configuration. Additionally, in some embodiments, the lever 154 may extend outwards through the cut-out 160, providing a user access to the lever 154.

In some embodiments, the sled 122 may additionally be configured to act as a stop to prevent hyper-rotation of the latch 146. For example, and as shown in FIG. 8, the lever 154 of the rotatable latch 146 may contact the faceplate 144 when the rotatable latch 146 is in the locked configuration, and, inversely, the lever 154 may contact an edge of the cut-out 160 of the faceplate 144 when in the unlocked configuration. Alternatively, or in addition to the lever 154, an indent 155 may be positioned on the top surface 148A of the body 148 and may be configured to interact with a boss 162 positioned on the top wall 128 of the housing 104 to limit over rotation. In further detail, the boss 162 may extend past the top surface 148A and into the indent 155, such that as the latch 146 is rotated the boss 162 will contact the side walls of the indent 155 when the latch 146 is in either the locked or unlocked configuration, preventing further rotation. Additionally, the combination of the boss 162 and the indent 155 may reduce the chance of improperly assembling the light fixture mount 100.

Figure 13:
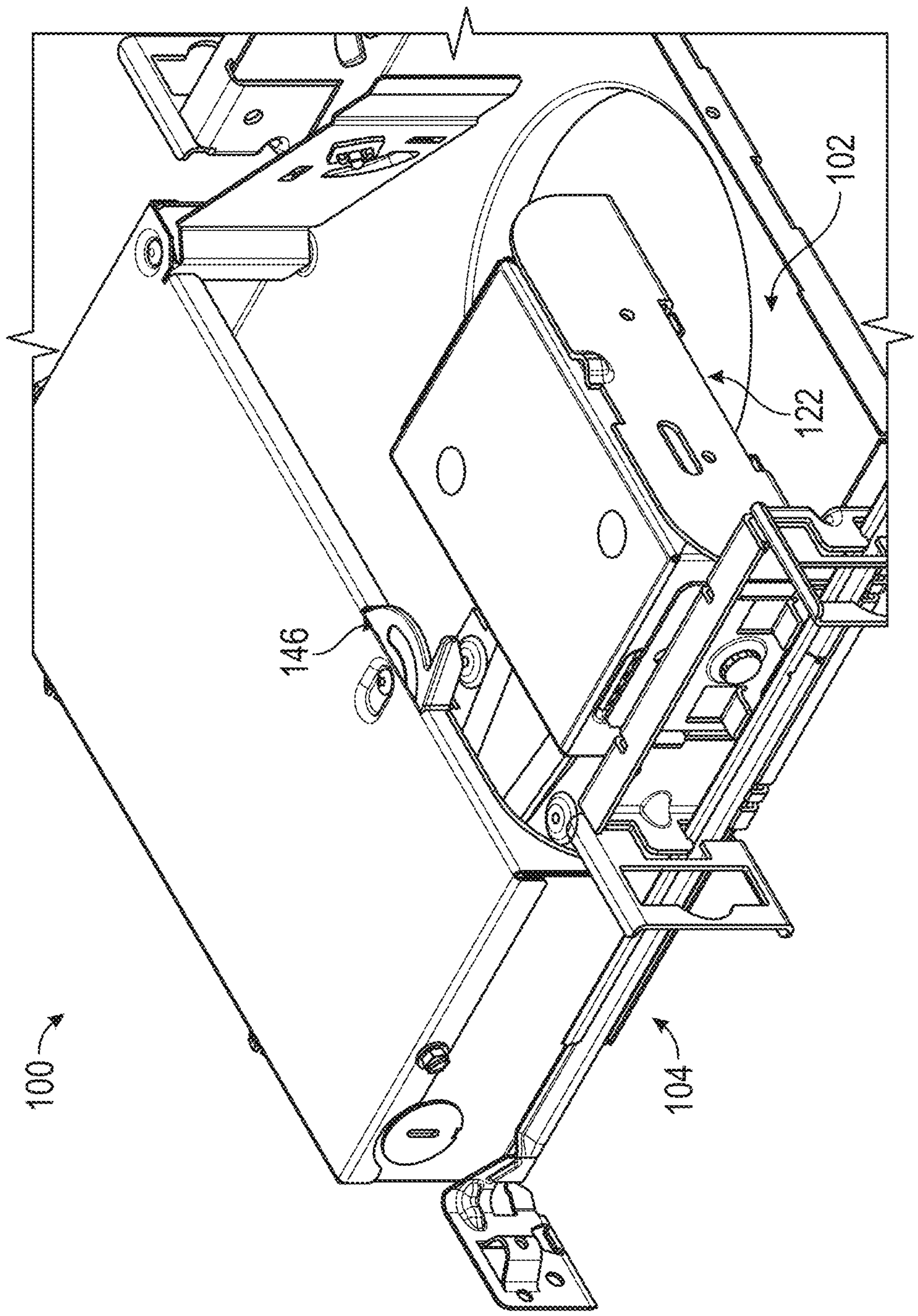
FIGS. 13-15 illustrate a sequence of locking the sled to a light fixture mount using a rotatable latch in accordance with the present disclosure.
Figure 14:
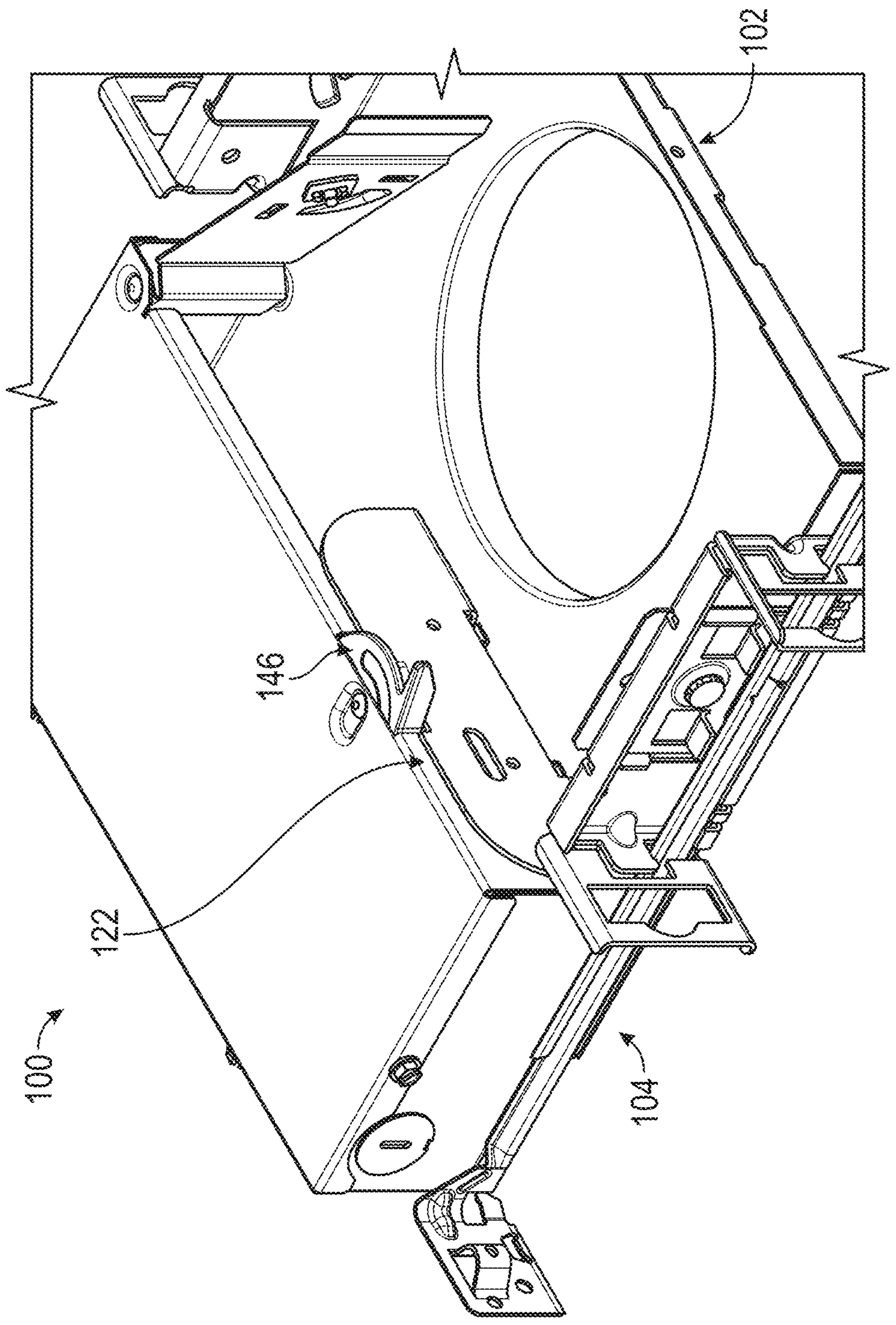
Figure 15:
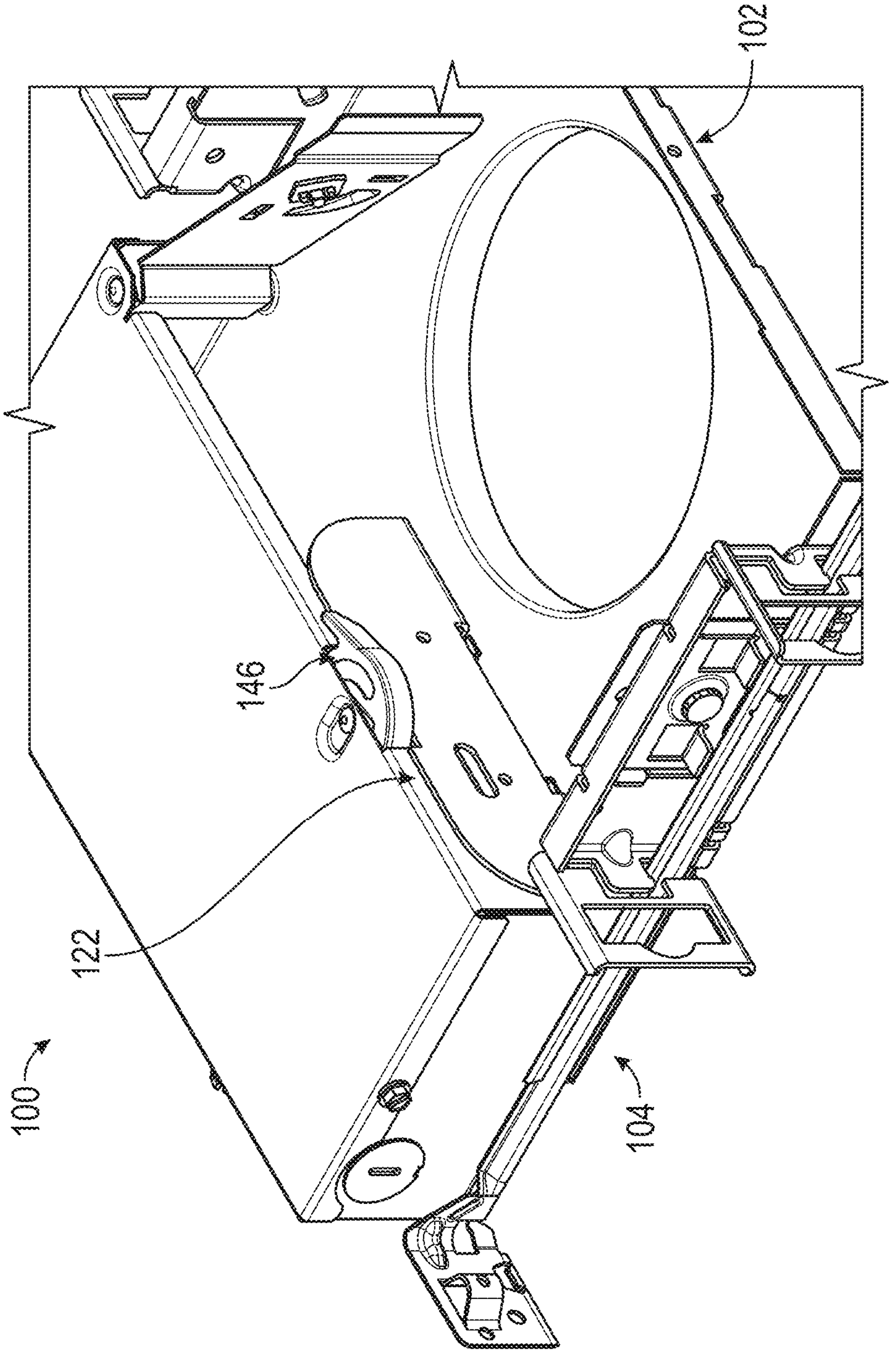

A process for inserting and securing the sled 122 to the housing 104 is depicted in FIGS. 13-15. FIG. 13 depicts the rotatable latch 146 in an unlocked configuration and the sled 122 and the light driver positioned outside of the compartment 118, allowing for the light driver to be easily accessed such that the driver may be installed, repaired or replaced, without needing to empty or remove other components or wiring positioned within the housing 104.

Once the sled 122 is ready to be inserted, the sled 122 and the light driver may be positioned within the compartment 118. As shown in FIG. 14, the faceplate 144 may cover at least a portion of the access opening 130 of the housing 104. However, the rotatable latch 146 is still in an unlocked configuration, meaning that the sled 122 is not secured within the compartment 118.

To secure the sled 122 and now referring to FIG. 15, the rotatable latch 146 may be rotated counter-clockwise until the lever 154 of the rotatable latch 146 contacts or is positioned adjacent the faceplate 144 of the sled 122. Once rotated, the lip 152 of the latch 146 may partially extend over the faceplate 144 of the sled. Additionally, during the rotation, the ridge 156 of the latch 146 passes over the projection 158 of the sled 122 to lock the latch 146 in the locked configuration and thereby hold the sled 122 in positioned. Rotation of the latch 146 may be accomplished using a single hand.

To remove the sled 122 and the light driver from the compartment 118, the process described above may be reversed. More specifically, the latch 146 is rotated so that the ridge 156 disengages from the projection 158 and the lip 152 rotates within cut-out 160 beyond the faceplate 144 to permit removal of the sled 122. As noted above, the latch 146 may rotate within the plane of the body 148 and/or with a footprint defined by a peripheral edge 159 as the latch 146 is transitioned between the locked and unlocked configurations. In this way, activation of the latch 146 may not require its movement outside of the plane and/or the footprint. In some non-limiting embodiments, the latch 146 rotates within a plane that extends substantially parallel to the base 102 (which often will be in a horizontal plane when installed). Activation of the latch does not require movement in a vertical direction (e.g., in a plane perpendicular to the base). The process described herein is merely exemplary and is not intended to be limiting, various modifications to this process are envisioned and encompassed within the scope of this disclosure. Additionally, FIGS. 13-15 depict and describe a light driver being used in conjunction with the sled 122, however, this is merely exemplary as is not intended to be limiting. It is envisioned within the scope of this disclosure that various components of a light fixture may be used in conjunction with the sled 122.

The present embodiment is described in relation to the use of the rotatable latch 146 in the context of a light fixture driver and a sled 122, however, this is merely exemplary and it is envisioned that the components described herein may be used in various other lighting applications and may be used in conjunction with other light fixture components than the light fixture driver.

The various aspects, embodiments, implementations, or features of the described embodiments can be used separately or in any combination. In particular, it should be appreciated that the various elements of concepts from FIGS. 1-15 may be combined without departing from the spirit or scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall results as if absolute and total completion were obtained.

Preferred embodiments of this invention are described herein, including the best mode known to the inventors for carrying out the invention. The invention is susceptible to various modifications and alternative constructions, and certain shown exemplary embodiments there are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claim appended hereto as permitted by applicable law. Moreover, any combination of the above-described elements in all possible variations thereof is encompassed by the invention unless otherwise indicated herein or otherwise clearly contradicted by context. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A light fixture mount comprising:
- a base defining an opening extending through the base;
- a housing positioned on the base that defines a compartment, wherein an access opening is provided in the housing for access to the compartment;
- a sled configured to be positioned at least partially within the compartment, the sled including:
  - a sled base configured to support at least one component for a light engine; and
  - a faceplate extending from and at an angle relative to the sled base, wherein the faceplate is configured to at least partially cover the access opening when the sled is positioned at least partially within the compartment; and
- a latch comprising a latch body extending in a plane, wherein the latch body is rotatably coupled to the housing and is configured to rotate within the plane between a locked configuration and an unlocked configuration, wherein, in the locked configuration, the latch engages and secures the sled to the housing.

2. The light fixture mount of claim 1, wherein the latch further comprises a lip extending downwardly from the latch body and partially around a perimeter of the latch body.

3. The light fixture mount of claim 2, wherein, in the locked configuration, the lip of the latch overlaps with the faceplate of the sled.

4. The light fixture mount of claim 2, wherein the latch further comprises a ridge provided on the lip, wherein the ridge extends radially inwards from the lip.

5. The light fixture mount of claim 4, wherein, in the locked configuration, the ridge of the latch is configured to interact with a projection on the faceplate.

6. The light fixture mount of claim 2, wherein the latch further comprises an aperture extending through the latch body and wherein the latch is configured to be rotatably coupled to the housing using a fastener inserted through the aperture of the latch.

7. The light fixture mount of claim 2, wherein the latch further comprises a lever positioned adjacent to the lip and extending outward tangentially relative to the perimeter of the latch body.

8. The light fixture mount of claim 7, wherein the lever of the latch is configured to contact at least a portion of the faceplate when the latch is in the locked configuration.

9. The light fixture mount of claim 2, wherein, in the unlocked configuration, the lip of the latch does not overlap the faceplate of the sled.

10. The light fixture mount of claim 5, wherein the faceplate includes a cut-out along an upper edge of the faceplate adapted to receive the lip when the latch is rotated into the unlocked configuration.

11. The light fixture mount of claim 1, wherein the housing comprises at least one side wall, a back wall, and a top wall.

12. The light fixture mount of claim 1, wherein the housing includes a first dimension and a second dimension which is smaller than the first dimension, wherein the first dimension of the compartment may extend substantially parallel to the base and the second dimension may extend substantially perpendicular to the base.

13. The light fixture mount of claim 1, further comprising a door configured to selectively cover at least a portion of the access opening of the compartment.

14. A light fixture comprising:
- a light engine including at least one light source and a light driver; and
- a light fixture mount configured to support the light engine comprising:
  - a base defining an opening extending through the base;
  - a housing positioned on the base that defines a compartment, wherein an access opening is provided in the housing for access to the compartment;
  - a sled configured to be positioned at least partially within the compartment, the sled including:
    - a sled base configured to support at least one component for the light engine; and
    - a faceplate extending upwards from the sled, wherein the faceplate is configured to at least partially cover the access opening when the sled is positioned at least partially within the compartment; and
  - a latch comprising a latch body extending in a plane, wherein the latch body is rotatably coupled to the housing and is configured to rotate within the plane between a locked configuration and an unlocked configuration, wherein, in the locked configuration, the latch engages and secures the sled to the housing.

15. The light fixture of claim 14, wherein the light fixture is configured to be positioned within a ceiling.

16. The light fixture of claim 14, wherein the latch comprises a lip extending downwardly from the latch body and partially around a perimeter of the latch body.

17. The light fixture of claim 16, wherein the latch further comprises a ridge provided on the lip, wherein the ridge extends radially inwards from the lip.

18. The light fixture of claim 17, wherein, in the locked configuration, the ridge of the latch is configured to interact with a projection on the faceplate.

19. The light fixture of claim 14, wherein the housing includes a first dimension and a second dimension which is smaller than the first dimension, wherein the first dimension of the compartment may extend substantially parallel to the base and the second dimension may extend substantially perpendicular to the base.

20. A light fixture mount comprising:

a base defining an opening extending through the base;

a housing positioned on the base that defines a compartment, wherein an access opening is provided in the housing for access to the compartment;

a sled configured to be positioned at least partially within the compartment, the sled including:

a sled base configured to support at least one component for a light engine; and a faceplate extending upwards from the sled, wherein the faceplate is configured to at least partially cover the access opening when the sled is positioned at least partially within the compartment; and a latch comprising a latch body extending in a plane and a lip extending downwardly from the latch body and partially around a perimeter of the latch body, wherein the latch body is rotatably coupled to the housing and is configured to rotate within the plane between a locked configuration and an unlocked configuration, wherein, in the locked configuration, the latch engages and secures the sled to the housing;

wherein, in the locked configuration, the lip of the latch overlaps with the faceplate of the sled, wherein the latch further comprises a ridge provided on the lip, wherein the ridge extends radially inwards from the lip, and wherein, in the locked configuration, the ridge of the latch is configured to interact with a projection on the faceplate.

* * * * *